United States Patent

Tobin, III

[15] 3,693,406
[45] Sept. 26, 1972

[54] METHOD FOR INSPECTING FILTERS
[72] Inventor: Benjamin F. Tobin, III, Los Altos, Calif.
[73] Assignee: Air Intake Renu, Montebello, Calif.
[22] Filed: Jan. 20, 1971
[21] Appl. No.: 108,139

Related U.S. Application Data

[62] Division of Ser. No. 5,546, Jan. 26, 1970.

[52] U.S. Cl. ..........................73/38, 73/40, 73/45.5
[51] Int. Cl. ........................G01m 3/00, G01n 15/08
[58] Field of Search ...73/38, 40, 45.5; 134/149, 152, 134/168

[56] References Cited

UNITED STATES PATENTS 3,336,793  8/1967  Tuttle ..........................73/40
3,442,273  5/1969  Hanish ........................134/152
3,608,379  9/1971  Brevko ........................73/38

Primary Examiner—S. Clement Swisher
Attorney—Christie, Parker & Hale

[57] ABSTRACT

Method and apparatus are described for washing hollow cylindrical engine air cleaners or filter elements on inside and outside surfaces. After the washing operation and before drying the filters are inspected by directing a forceful flow of water heavily aerated with entrained bubbles of air against the filter surface. Visual observation of bubbles passing through the filter element provides rapid and reliable detection of leaks through the filter.

5 Claims, 6 Drawing Figures

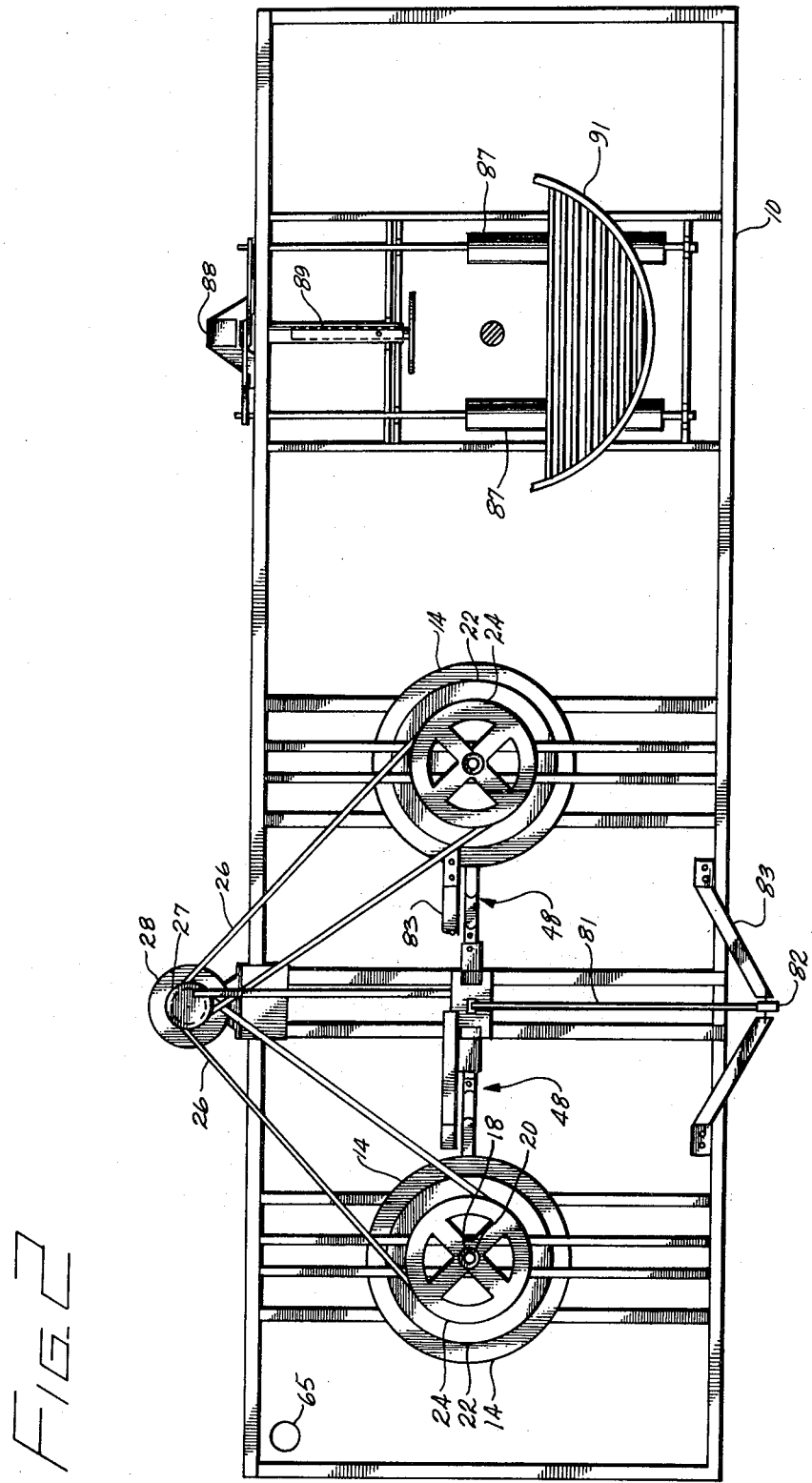

METHOD FOR INSPECTING FILTERS

This is a division of Pat. application Ser. No. 5,546 filed Jan. 26, 1970, now U.S. Patent 3,606,897.

BACKGROUND

This is a division of patent application, Ser. No. 5,546 filed Jan. 26, 1970.

Heavy trucks, earthmovers and similar off-the-road equipment customarily include a large air filter for removing dust from the air intake to the engine, thereby protecting the engine. Such air cleaners commonly involve canisters in which a pleated paper air filter element is positioned so that the intake air to the engine is passed through the porous paper of the filter. Any dirt, grit or other foreign material is caught by the filter while the air passes so that it is prevented from entering the engine. When these filters have accumulated a substantial layer of dust, dirt and other debris, sometimes including oily material, they are removed from the canister and either discarded or cleaned.

In recent years, such cylindrical pleated paper filters have been made of resin impregnated paper which can be washed in order to remove accumulated dirt and debris so that the filter element can be reused many times, thereby effecting a very substantial cost saving without significantly decreasing the filtering efficiency of the air filter. Manual washing of the air filters involves a substantial amount of labor and is not customarily economical. Mechanical devices have been devised for cleaning filters; however, these have not proved satisfactory since they do not adequately clean the filters and manual finishing is usually required. In the best known apparatus for washing filters, approximately 40 filter elements per day could be washed sufficiently for reuse. Any substantial increase in the speed of cleaning with as good or better performance than existing machinery would substantially reduce the cost of cleaning and enhance the desirability of cleaning rather than discarding used air filter elements. After washing it is desirable to inspect the filters for leaks so that dirt is not pulled through holes in the filter into an engine or the like. Inspection by a bright light as has been done in the past is not satisfactory.

BRIEF SUMMARY OF THE INVENTION

Thus, in practice of this invention according to a preferred embodiment, there is provided method and apparatus for inspecting an air filter or the like comprising rotation of the filter for visual inspection and direction of a flow of water having a large number of bubbles of air entrained in the water against a surface of the air filter whereby the air bubbles are prevented from passing by the surface tension of the wet filter and are permitted to pass through leaks through the filter.

DRAWINGS

Other features and advantages of the present invention will be apparent from the following detailed description of a presently preferred embodiment when considered in connection with the accompanying drawings wherein:

FIG. 2 is a top view of the apparatus of FIG. 1;

FIG. 5 illustrates a spray nozzle arrangement for the apparatus of FIG. 1; and

FIG. 6 illustrates a ratchet mechanism for translating the spray elements of FIG. 5.

Throughout the drawings like reference numerals refer to like parts.

DESCRIPTION

Figure 1:
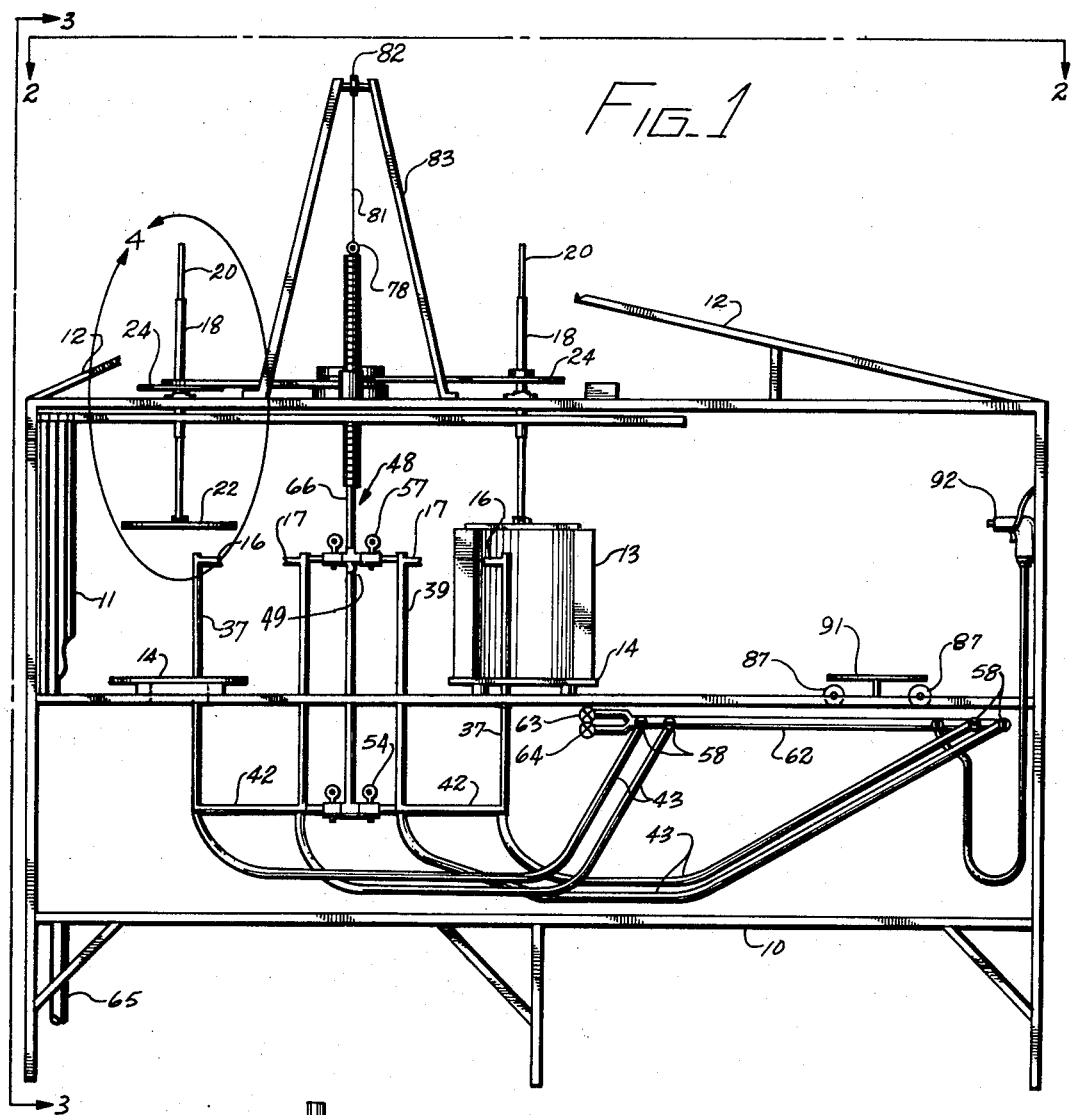
FIG. 1 is a front view of a filter washing apparatus constructed according to principles of this invention, with side panels removed to better illustrate the internal mechanisms.
Figure 3:
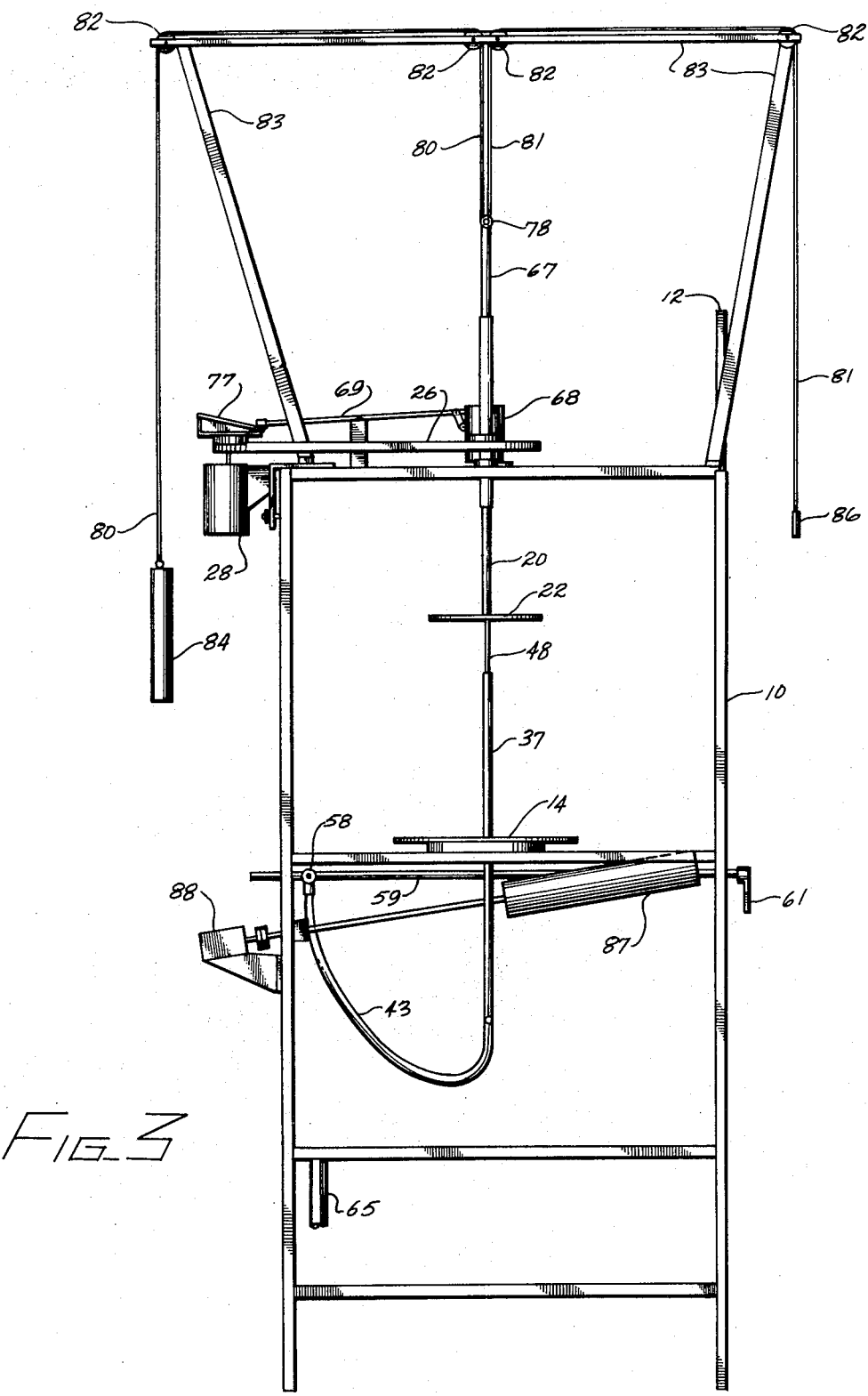
FIG. 3 is an end view of the apparatus of FIG. 1.

FIGS. 1, 2 and 3 illustrate in front, top and end views, respectively, an air filter washing apparatus constructed according to principles of this invention. In these drawings sheet metal panels surrounding and forming sides of the apparatus have been deleted in order to illustrate the operating mechanisms, and it will be apparent that any appropriate paneling, shielding and the like can be provided to contain water and cleaning solutions sprayed about within the apparatus. The omitted metal side panels are connected to an apparatus frame 10 which is conveniently welded together from angle iron and the like. A slidable transparent curtain 11 is provided across an open front portion of the apparatus so that it can be pushed to one side for loading and unloading filters and drawn across the front of the apparatus during use to prevent splashing water from leaving the apparatus. Any other closure desired may be used, such as doors or the like. A truss-like stiffening frame 12 is provided over the top of the broad front opening of the apparatus since this portion of the top is not sufficiently supported by the sheet metal sides.

Rather generally speaking, an air filter element 13 is mounted with its axis vertical on a horizontal turntable 14 so that the hollow cylindrical air filter can be rotated about the vertical axis. In FIG. 1 an air filter element 13 is illustrated in cross section on one of the two turntables 14. An inside spray nozzle 16 and an outside spray nozzle 17 are arranged opposite each other on opposite sides of the wall of the air filter 13 so that spray from the nozzles 16 and 17 impinges on both the inside and outside surfaces, respectively, of the air filter while it is rotating on the turntable 14. The spray nozzles 16 and 17 are mounted for vertical translation so that during normal operation spraying is commenced at the top of the filter and progressively the spray nozzles traverse downwardly along the filter to spray the entire length with a cleaning solution or rinse water.

Figure 4:
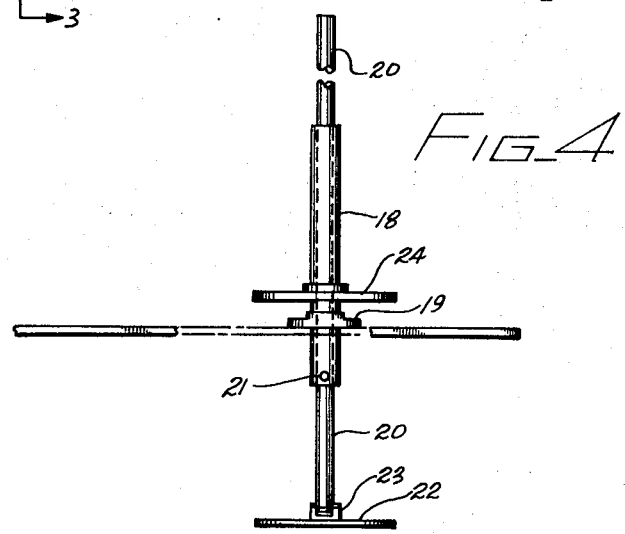
FIG. 4 is a detail of means for holding an air filter in position and rotating it about a vertical axis.

The filter is caused to rotate by a motor driven clamping mechanism best seen in FIGS. 1, 3 and 4. This mechanism includes a sleeve 18 mounted in a bearing 19 on the top of the cabinet of the washing apparatus directly above each turntable 14. A shaft 20 is mounted within the sleeve 18 for vertical translation and is held in position by a set screw 21 which is preferably provided with a T-handle (not shown) or the like so that it can be readily and quickly released and tightened. On the lower end of the shaft 20 a broad, stiff circular rubber pad 22 is mounted by a transverse pin 23 so that the pad 22 has some ability to tilt.

A pulley 24 is fixed to the sleeve 18 and a conventional drive belt 26 extends between the pulley 24 and a pulley 27 on a drive motor 28. In a preferred arrangement a pair of washing stations are provided and two such holding and driving mechanisms are provided as is readily seen in the top view of FIG. 2.

During operation, the motor 28 rotates thereby driving the pulley 24 which is fixed to the sleeve 18. Rotation of the sleeve also rotates the shaft 20 when the set screw 21 is tightened, and the rubber pad 22 is thereby rotated for engaging the top of a filter 13 on the turntable 14 so that the filter and turntable are thereby rotated. By providing the drive at the top and an idler turntable at the bottom, problems of water in the drive mechanisms are avoided.

As mentioned briefly hereinabove, the spray nozzles are supplied with cleaning or rinsing solutions through flexible hoses 43. The hoses have sufficient length to accommodate vertical translation of the spray bars during operation of machine as hereinafter described, and their opposite ends are connected to a series of quarter-turn valves 58 positioned at the rear of the filter washing apparatus. An elongated bar 59 (FIG. 3) extends from each valve 58 to a handle 61 at the front of the apparatus for manual operation. It is preferred to employ valves 58 at the rear of the apparatus since after prolonged use some leakage of these valves may occur and can be tolerated since it does not strike the operator in front of the machine. The several valves 58 are connected to a fluid manifold 62 which is, in turn, connected to a cold clear water valve 63 for rinsing and a hot soapy water valve 64 for washing filters. The selection of hot and cold water is controlled by the manual valves 63 and 64 to which cold water and hot soapy water are provided in a conventional manner. The supply valves 63 and 64 are also preferably at the rear of the apparatus and operated from the front to protect the operator. It is of more interest that these manifold valves be at the back since these are the ones found to leak more often. A drain 65 in the pan at the bottom of the apparatus carries dirty water to waste.

When the air filter element is removed from the table 14 it is placed on a pair of parallel rollers 87 (FIGS. 2 and 3) which are rotated by a motor 88 at the rear of the apparatus. Rollers 87 are titled so the forward ends are higher than the rearward ends and an adjustable stop 89 if provided behind the sloping rollers to keep the air filter element from sliding too far rearwardly. While in place on the rollers 87, the air filter element is manually inspected for tears, breaks or holes in the paper which would pass dust to the engine. If upon manual inspection a remaining dirty area is noted, a circular removable grill 91 which can conveniently be an ordinary barbecue grill is placed in position over the rollers 87 so that the air filter element can be set thereon and spot cleaned with a hand-operated nozzle 92. This grill is also useful for manual cleaning of the approximately 4 percent of existing filter types that do not provide access for a central spray nozzle and are, therefore, usually cleaned manually.

The hand operated nozzle 92 is employed for inspection as well as spot cleaning of the filters after the automatic cleaning steps. The hand nozzle is preferably a pistol grip type of unit with a hand-operated valve and has a large forceful flow of water heavily aerated with entrained bubbles of air. This is to be contrasted with a fine needle-like spray or a single hard jet of water. A forceful flow of relatively large volume is desired in order to force water through any apertures in the filter and also to effect spot cleaning where required. The heavy aeration to provide a large number of bubbles within the flow of water is desired for inspection purposes.

Inspection with the hand nozzle 92 is normally conducted in three stages. The first stage involves forward flow of water from the dirty side of the filter towards the clean side, that is, with the flow of water from the hand nozzle impinging on the normally dirty side of the filter. The water coming through to the normally clean side of the filter should be clear to indicate an adequately clean filter. The second stage of testing is a reverse flush where the stream of water from the hand nozzle is directed against the normally clean side of the filter and the water on the normally dirty side should also be clear to indicate proper cleaning.

The third stage of testing is to test for tears, separations in the bond, or the like, at the ends of the filter. This is of particular importance since in the normal course of testing the filters by viewing them in intense light, leaks at the ends can easily be overlooked or not seen at all under the best of conditions. In visual inspection any obvious holes in the filter element can be seen by the operator when the filter element is illuminated with bright light from one side and any tears, perforations, or the like, show up as a bright spot. Leaks at the ends of the filter are common since at the ends the paper filter element is sealed to the metal ends and this seal can be broken if the filter element is dropped or if the filter has been used under adverse conditions that may cause cracking of the sealing material. Sometimes poorly sealed areas are found due to manufacturers' faults and in other instances the seal separates from the metal ends in use. Such leakage at the ends is not readily determined with light inspection.

In order to find the end leaks, the filter is laid on the rollers 87 and the hand gun 92 with a full flow of aerated water is held in one position to direct the flow against the filter element as the filter rotates. In a sound filter having no holes, tears or perforations, the wet paper forming the filtering material prevents the passage of air due to the surface tension forces of the liquid within the porous paper. Water may flow through the porous paper but air will not when it is wet. If, on the other hand, there is a hole, the force of aerated water against the paper causes bubbles of air to pass through the hole and these bubbles are readily seen on the reverse side of the filter. Thus, as the hand nozzle scans around the end of the filter rotating on the rollers, the heavily aerated forceful flow of water passes water through a sound filter but causes a stream of air bubbles within the water to be seen at any leaks through the filter. This has been found to be an excellent inspection technique for identifying filters having leaky elements.

By using an aerated flow of water against the filter after cleaning in the automatic station, any leaks in the filter can be detected at an early stage before all of the cleaning operations have been completed. After washing the filters in the disclosed apparatus they are dried for many hours at low temperature in a forced drying oven for complete drying without damaging the resins in the paper. After prolonged drying, the filters are inspected with bright lights for holes or tears. By detecting such holes or tears immediately after washing, the filter can be immediately discarded instead of going through the drying and subsequent inspection cycles, thereby effecting a substantial saving of time and effort.

It is found in operating a unit as hereinabove described that the manual inspection, and spot cleaning if needed, of a pair of air filter elements can be readily completed while another pair is being automatically cleaned in the two cleaning stations. Thus, only a single operator is required with the apparatus. With such an arrangement, ten to twelve air filter elements can be cleaned per hour as compared with about five per hour with the best previous cleaning apparatus. In addition, since the inside and outside sprays impinge on only a limited area during cleaning, a relatively high pressure can be maintained and the filter elements are cleaner after automatic operation than in the previous apparatus and appreciably less manual spot cleaning is required.

Drying of washed filters is conducted in a low temperature oven in a conventional manner and forms no part of this invention.

Although but a single embodiment of an apparatus for washing air filter elements has been described and illustrated herein, it will be readily understood that many modifications and variations of the present invention can be made by one skilled in the art.

What is claimed is:

1. A method of inspecting an air filter or the like having a liquid wettable porous membrane comprising the steps of:

directing a forceful flow of aerated liquid against one face of the membrane; and
   observing the opposite surface of the membrane for the presence of gas bubbles in liquid flowing therethrough.

2. Apparatus for inspecting an air filter or the like comprising:

means for rotating a filter for visual inspection; and
   means for directing a flow of water having a large number of bubbles of air entrained in the water against a surface of the air filter.

3. Apparatus as defined in claim 2 wherein the means for rotating comprises:

a pair of almost horizontal, parallel, spaced apart rollers; and
   means for rotating at least one of the rollers.

4. Apparatus as defined in claim 3 wherein the means for directing a flow of water has sufficient force to pass bubbles of air through leaks in the filter and insufficient to overcome surface tension of liquid in a porous filter.

5. Apparatus as defined in claim 4 wherein the means for directing a flow of water comprises a hand held nozzle.

* * * * *